(12) United States Patent
Mesmer (10) Patent No.: US 10,194,766 B2
(45) Date of Patent: Feb. 5, 2019

(54) SYSTEMS AND METHODS FOR PREVENTING BOILOVER

(71) Applicant: Elsa Toclu Mesmer, Shoreline, WA (US)

(72) Inventor: Elsa Toclu Mesmer, Shoreline, WA (US)

(*) Notice: Subject to any disclaimer, the term of this patent is extended or adjusted under 35 U.S.C. 154(b) by 496 days.

(21) Appl. No.: 14/987,627

(22) Filed: Jan. 4, 2016

(65) Prior Publication Data
US 2016/0192804 A1 Jul. 7, 2016

Related U.S. Application Data

(60) Provisional application No. 62/099,566, filed on Jan. 4, 2015.

(51) Int. Cl.
*A47J 27/56* (2006.01)
*A47J 27/04* (2006.01)

(52) U.S. Cl.
CPC ............ *A47J 27/56* (2013.01); *A47J 27/04* (2013.01); *A47J 2027/043* (2013.01)

(58) Field of Classification Search
CPC ...... A47J 2027/043; A47J 27/04; A47J 27/56; A47J 27/58; A47J 27/60
USPC ........................ 99/403, 410, 646 C
See application file for complete search history.

(56) References Cited

U.S. PATENT DOCUMENTS

| | | | |
|---|---|---|---|
| 6,405,638 B1* | 6/2002 | Chen | A47G 19/14 99/317 |
| 8,900,451 B2* | 12/2014 | Cooper | A47J 43/285 210/232 |
| 2013/0101720 A1* | 4/2013 | Allaire | A23L 1/0151 426/510 |

* cited by examiner

*Primary Examiner* — Dana Ross
*Assistant Examiner* — James Sims, III
(74) *Attorney, Agent, or Firm* — Michelle E. Carey; Telekta Law, P.S.

(57) ABSTRACT

A system consisting of a pot and a series of strainers, the series of strainers configured to allow liquids and gasses to move freely within the pot while containing foodstuffs. The strainers are disposed such that they disrupt the formation of bubbles that leads to boilover while minimizing the loss of volume within the pot. The system of strainers may look like an inverted dome coupled with a dome, allowing foods and liquids to expand within the pot without allowing bubbles to pile up and boilover. The system of strainers may be a single piece permanently coupled or may be one or more strainers removably coupled by a user. At least one of the strainers may include at least one grip. The system of strainers may include means by which they can be specifically positioned within the pot. The system may include at least one lid.

18 Claims, 6 Drawing Sheets

SYSTEMS AND METHODS FOR PREVENTING BOILOVER

FIELD OF THE INVENTION

This invention relates generally to receptacles, and, more specifically, to cookware.

BACKGROUND OF THE INVENTION

Cooking items that change the nature of the water, specifically items that change the nature of water's surface tension, can lead to unpleasant results such as water and food items boiling over the edge of the cookware. At best, this is a common kitchen annoyance. At worst, this can lead to fire and injury to the cook and others in the vicinity, including small children. Most pots and pans will boil over even with a lid in place. These are just some of the problems that the present invention, disclosed in detail herein, aims to overcome.

SUMMARY OF THE INVENTION

This invention relates generally to receptacles, and, more specifically, to cookware.

A system consisting of a pot and a series of strainers, the series of strainers configured to allow liquids and gasses to move freely within the pot while containing foodstuffs. The strainers are disposed such that they disrupt the formation of bubbles that leads to boilover while minimizing the loss of volume within the pot. The system of strainers may look like an inverted dome coupled with a dome, allowing foods and liquids to expand within the pot without allowing bubbles to pile up and boilover. The system of strainers may be a single piece permanently coupled or may be one or more strainers removably coupled by a user. At least one of the strainers may include at least one grip. The system of strainers may include means by which they can be specifically positioned within the pot. The system may include at least one lid.

The system is comprised essentially of means for containing liquids and foodstuffs; means for straining the liquids and foodstuffs; and means for disrupting bubbles formed by the boiling of the liquids and foodstuffs.

In some embodiments, the system for preventing boilover is comprised of: at least one pot; at least one first strainer disposed within the at least one pot; and at least one second strainer removably coupled with the first strainer. In some embodiments, the at least one first strainer further comprises: at least one means for controlling the depth of insertion within the at least one pot. In some embodiments, the at least one first strainer further comprises: at least one means by which liquids and gasses can pass from a first side of the strainer to a second side of the strainer. In some embodiments, the at least one first strainer further comprises: at least one hole disposed at a low point in the at least one first strainer. In some embodiments, the at least one hole disposed at a low point in the at least one first strainer substantially follows a general shape of the at least one first strainer. In some embodiments, the at least one first strainer further comprises: at least one lower rim disposed at a low point in the at least one first strainer. In some embodiments, the at least one first strainer further comprises: at least one groove disposed on the at least one lower rim. In some embodiments, the at least one second strainer further comprises: at least one means by which liquids and gasses can pass from a first side of the strainer to a second side of the strainer. In some embodiments, the at least one second strainer further comprises: at least one general shape consistent with a dome, wherein a high point of the dome is disposed away from a bottom surface of the at least one pot. In some embodiments, the at least one second strainer further comprises: at least one gripping means disposed at the high point on the at least one second strainer. In some embodiments, the at least one second strainer further comprises: at least one means by which the at least one second strainer can be removably coupled with the at least one first strainer. In some embodiments, the system is further comprised of: at least one lid.

In some embodiments, the system for preventing boilover is comprised of: at least one pot; at least one first strainer disposed within the at least one pot, the at least one first strainer may include at least: a shape substantially consistent with an inverted dome; and at least one large hole disposed at a low point of the at least one first strainer; and at least one second strainer removably coupleable with the at least one first strainer, the at least one second strainer may include at least: a shape substantially consistent with a dome; and at least one grip disposed at a high point of the at least one second strainer, wherein the at least one second strainer is disposed such that it substantially covers the at least one large hole disposed at a low point of the at least one first strainer. In some embodiments, the at least one first strainer may be further comprised of: a plurality of small holes distributed across a surface of the strainer such that liquids and gasses can pass from a first side of the strainer to a second side of the strainer. In some embodiments, the at least one second strainer may be further comprised of: a plurality of small holes distributed across a surface of the strainer such that liquids and gasses can pass from a first side of the strainer to a second side of the strainer. In some embodiments, the at least one first strainer may be further comprised of: at least one groove disposed around a perimeter formed by the at least one large hole. In some embodiments, the at least one first strainer may be further comprised of: at least one groove disposed around a perimeter formed by the at least one large hole, wherein the at least one second strainer may include at least: at least one tab disposed on a lower rim of the at least one second strainer, and wherein the at least one tab is configured to be removably insertable into the at least one groove of the at least one first strainer. In some embodiments, the at least one first strainer may be further comprised of: at least one groove disposed around a perimeter formed by the at least one large hole; at least one entrance location disposed within the at least one groove; wherein the at least one second strainer may include at least: at least one tab disposed on a lower rim of the at least one second strainer, and wherein the at least one tab is configured to be removably insertable into the at least one groove of the at least one first strainer by inserting the at least one tab into the at least one entrance location. In some embodiments, the at least one first strainer and at least one second strainer are removably lockable by inserting the at least one tab into the at least one entrance location and twisting the at least one second strainer such that the at least one tab moves further into the at least one groove.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings.

DETAILED DESCRIPTION

This invention relates generally to receptacles, and, more specifically, to cookware.

Specific details of certain embodiments of the invention are set forth in the following description and in FIGS. 1-8 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
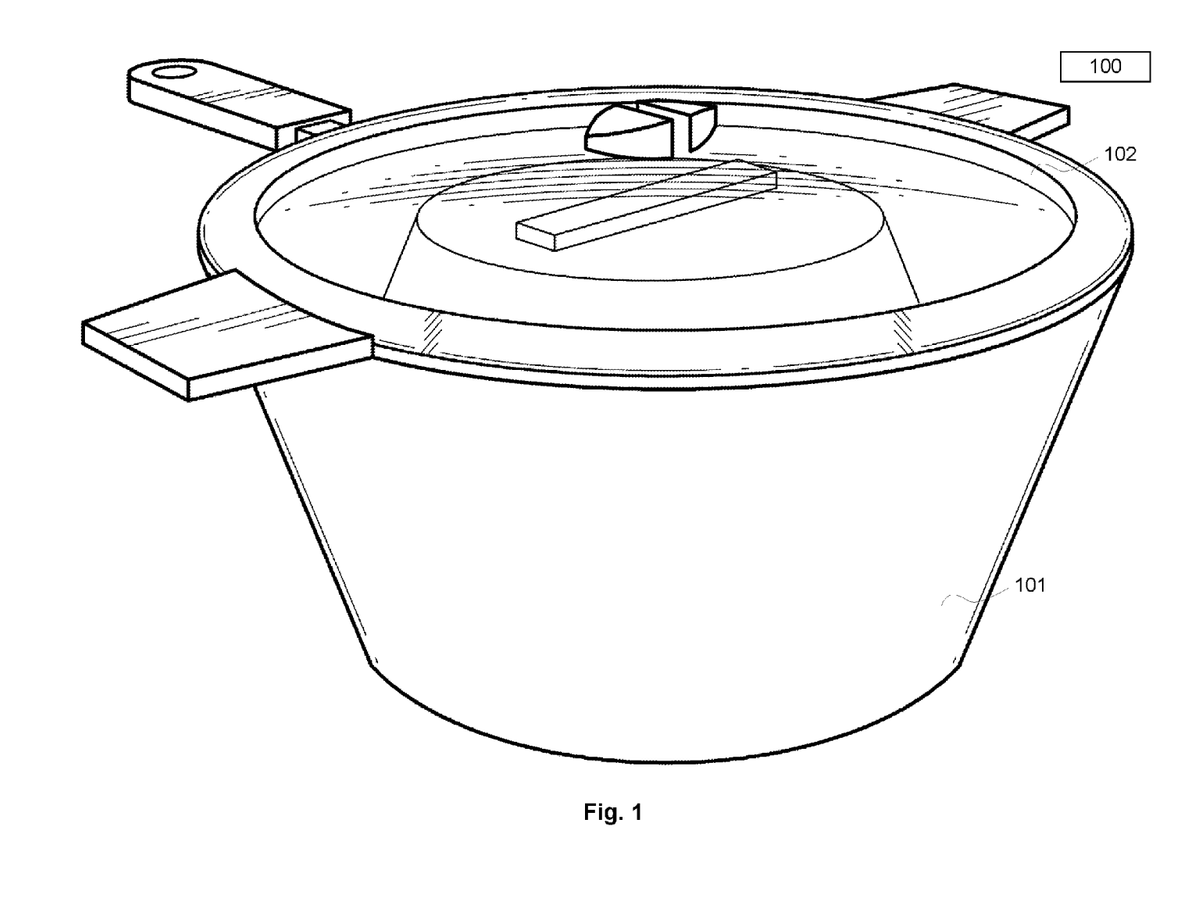
FIG. 1 is an isometric view of one embodiment of the system for preventing boilover.

FIG. 1 is an isometric view of one embodiment of the system for preventing boilover 100. The system is comprised essentially of a pot 101 and a lid 102.

Figure 2:
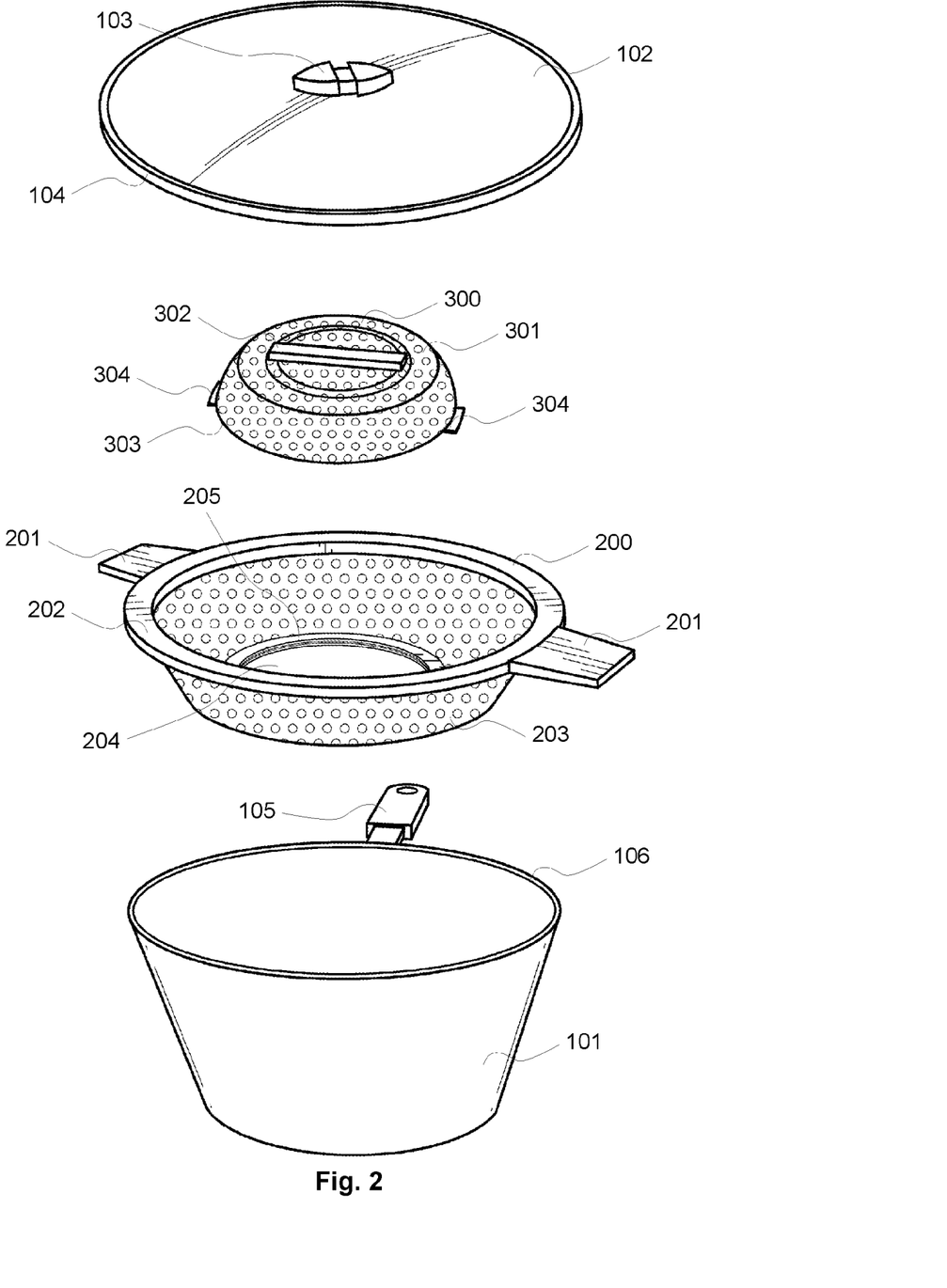
FIG. 2 is an exploded isometric view of one embodiment of the system for preventing boilover.

FIG. 2 is an exploded view of one embodiment of the system for preventing boilover 100. In some embodiments, the system includes a large strainer 200 and a small strainer 300.

In some embodiments, large strainer 200 is configured to sit within pot 101. In a preferred embodiment, large strainer 200 includes a mesh 203, which mesh allows water and other liquids to move through the strainer while keeping more solid items, such as foodstuffs, from passing from outside the strainer to inside the strainer. In some embodiments, mesh 203 may be a system of wires interwoven to form a strainer. In other embodiments, mesh 203 may be a substantially solid, rigid material with areas removed in a pattern or at random to let liquids and small particles pass through. In some embodiments, large strainer 200 may include at least one handle 201. In some embodiments, large strainer 200 may include two handles 201. One purpose of handle 201 is to allow large strainer 200 to be placed in and removed from pot 101 without injury to the user. Another purpose of handle 201 is to allow the strainer to rest on the upper rim 106 of pot 101, in order to keep the strainer suspended above the bottom inside surface of the pot. In other embodiments, large strainer 200 may include feet on lower rim 205, which feet would rest upon the bottom inside surface of pot 101. In still other embodiments, large strainer 200 may be coupled with lid 102 and suspended within pot 101 from the lid. In still other embodiments, handle 201 may be a single unit, such as a half-ring disposed from one side of large strainer 200 to the other. There may be other ways in which large strainer 200 is disposed within pot 101 without altering the function of the strainer.

In some embodiments, large strainer 200 may include an upper rim 202. In some embodiments, handles 201 may be disposed on or coupled with upper rim 202. In some embodiments, upper rim 202 may be configured to create a seal between pot 101 and lid 102. In some embodiments, upper rim 202 may be rigid. In other embodiments, upper rim 202 may be more flexible, allowing upper rim 106 of pot 101 and rim 104 of lid 102 to deform the rim to create a seal between the lid and the pot. In some embodiments, handles 201 and upper rim 202 may be one piece, such as extruded plastics or stamped metals. In other embodiments, handles 201 and upper rim 202 may be joined by welds, adhesives, or fasteners such as rivets. In some embodiments, rim 202 and strainer 200 may be a single unit, such as extruded plastics or stamped metals. In other embodiments, rim 202 and strainer 200 may be coupled by welds, adhesives, or fasteners.

In some embodiments, large strainer 200 may include a hole or gap 204. In some embodiments, hole 204 may be round in shape. In other embodiments, hole 204 may be rectangular or some sort of decorative shape, such as a star or tree shape. In some embodiments, hole 204 may generally follow the shape of the perimeter formed by large strainer 200. In other embodiments, hole 204 may be a different shape than large strainer 200. In some embodiments, hole 204 may be formed in part by lower rim 205. In some embodiments, lower rim 205 may be a separate unit coupled with the mesh 203 of strainer 200. In other embodiments, lower rim 205 and strainer 200 may be a single unit, such as extruded plastics or stamped metals.

In some embodiments, the system for preventing boilover may include small strainer 300. In some embodiments, small strainer 300 may be configured to fit within at least one perimeter formed by large strainer 200. In one example, small strainer 300 may include at least one locking means 304. In a preferred embodiment, locking means 304 may include at least one lock tab, which tab may be insertably coupleable with large strainer 200. This will be demonstrated in more detail with FIG. 3. In some embodiments, locking means 304 may be a snap lock mechanism, wherein pushing down on mesh 301 or handle 302 of small strainer 300 may force the locking means to couple with large strainer 200. In other embodiments, locking means 304 may be any other method by which small strainer 300 is removably coupleable with large strainer 200. In some embodiments, locking means 304 may be disposed on a lower rim 303 of small strainer 300. In other embodiments, locking means 304 may be disposed on at least one side of strainer 300, or on two opposing sides thereof, and configured to interface with an inside surface of large strainer 200. In some embodiments, lower rim 303 of small strainer 300 may be configured to interface or interlock with lower rim 205 of large strainer 200. In some embodiments, lower rim 303 may sit within a groove of lower rim 205. In other embodiments, lower rim 303 may be configured to easily rest on and be removed from lower rim 205.

In some embodiments, small strainer 300 may include a handle 302. One purpose of handle 302 may be to allow small strainer 300 to be easily placed into and removed from pot 101 and/or large strainer 200, while keeping the user's hand away from hot liquid and foodstuffs. Another purpose of handle 302 may be to allow a user to turn small strainer 300 such that locking means 304 are engaged or disengaged. This will be discussed further with FIG. 3. In some embodiments, handle 302 may be configured to removably engage with lid 102, such that placing or lifting lid 102 engages or disengages, respectively, small strainer 300.

Figure 3:
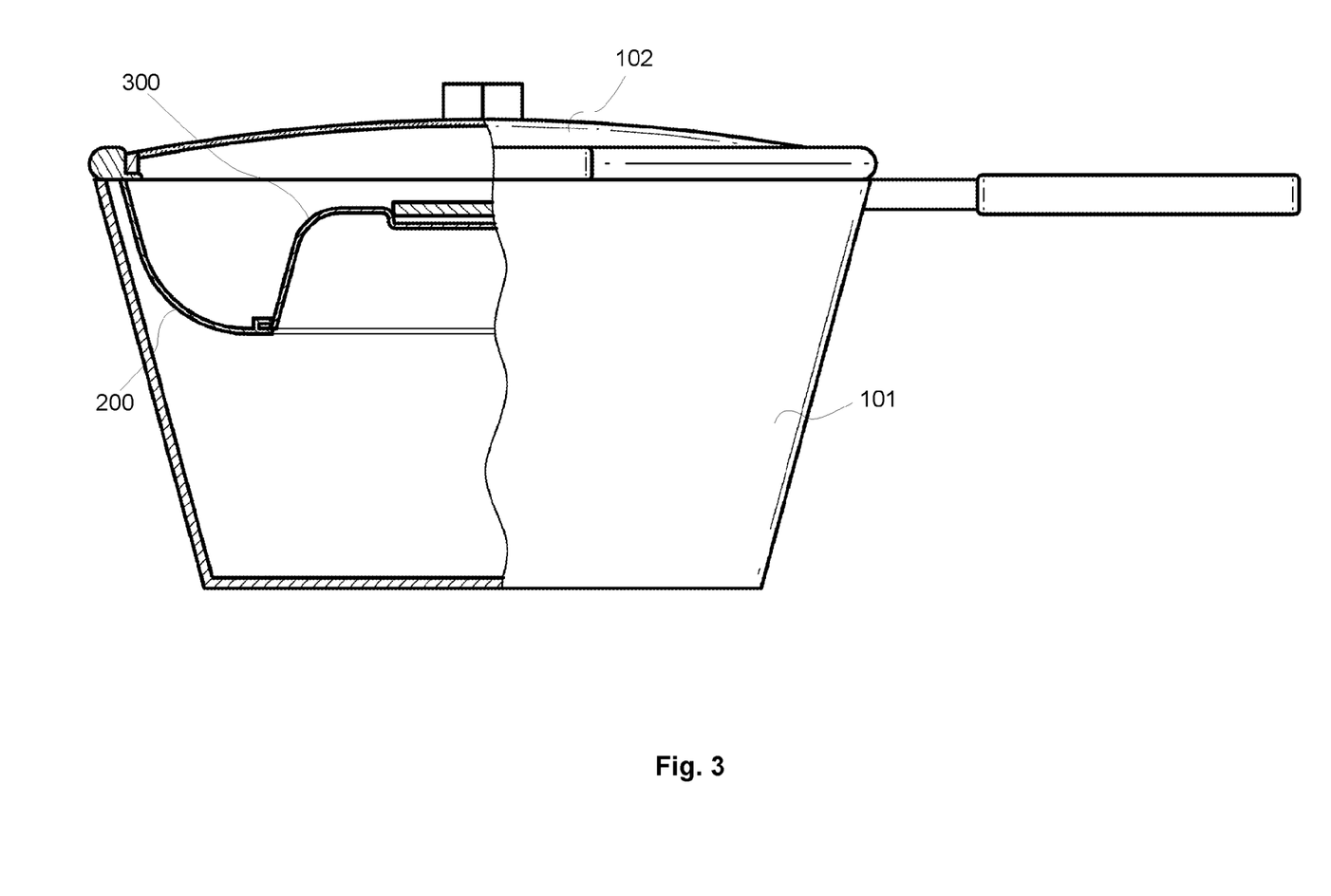
FIG. 3 is a cross-sectional view thereof.
Figure 4:
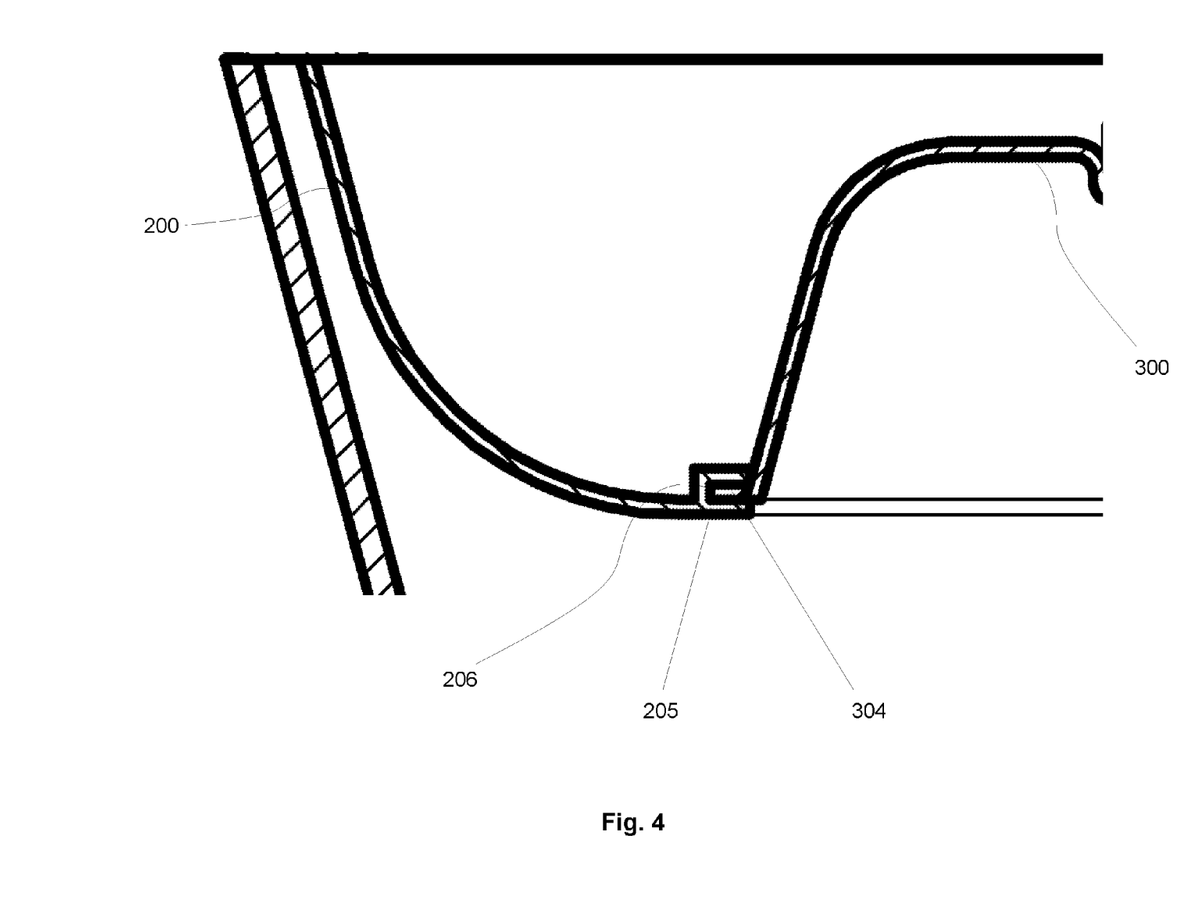
FIG. 4 is a close-up cross-sectional view thereof.

FIG. 3 is a cross-sectional view of one embodiment of the system for preventing boilover 100. In this exemplary embodiment, large strainer 200 is disposed within pot 101, small strainer 300 is disposed within the large strainer, and lid 102 is placed on top of pot 101 and over both the large and small strainers. FIG. 4 is a close-up cross-sectional view of the same embodiment, showing, in particular, the way in which small strainer 300 couples with large strainer 200. In this exemplary embodiment, lower rim 205 includes a groove 206. As groove 206 progresses around rim 205, it may get tighter, or it may have locking protrusions which cause a "snap" or "click" feeling and sound as locking means 304 passes them. To couple small strainer 300 and large strainer 200, locking means 304 may be inserted into the end of groove 206. Handle 302, not depicted (see FIG. 2) may be used to place locking means 304 at the beginning of groove 206. Handle 302 may also be used to turn small strainer 300 such that locking means 304 progresses along groove 206 until it locks into place. The locking can be accomplished in many ways. Preferred embodiments include a tab lock type interface or by virtue of groove 206 becoming progressively narrower and exerting increasing pressure on locking means 304. This disposes small strainer 300 directly over hole 204 of large strainer 200, allowing the boiling medium, such as water, to boil freely and cook the food, while also interrupting any bubbles that form and preventing boilover.

Figure 5:
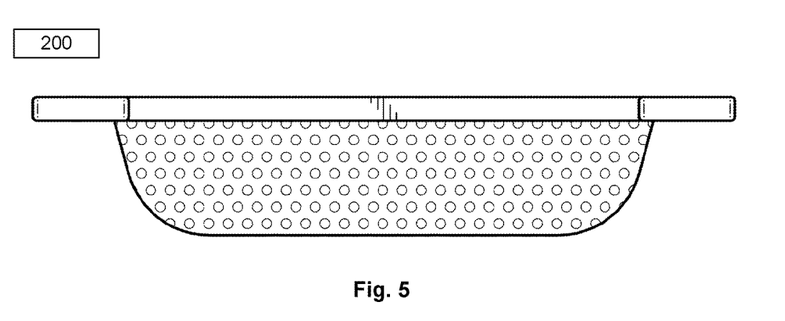
FIG. 5 is a side view of one component of the system for preventing boilover.
Figure 6:
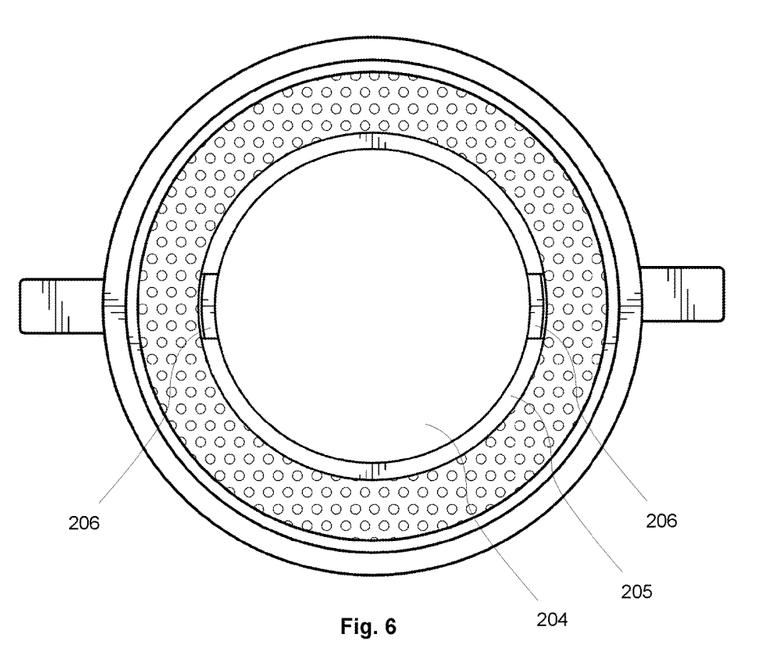
FIG. 6 is a top view thereof.

FIG. 5 is a side view of one embodiment of large strainer 200. FIG. 6 is a top view thereof, showing hole 204 formed by rim 205. Also shown is at least one entrance to groove 206, wherein locking means 304 (see FIG. 8) can be inserted in order to couple large strainer 200 with small strainer 300. In some embodiments, large strainer 200 may have two entrances to groove 206, or two grooves 206, so that locking means 304 can be disposed on two sides of small strainer 300, and the small strainer and large strainer can be coupled on at least two sides, forming a more secure combined unit.

Figure 7:
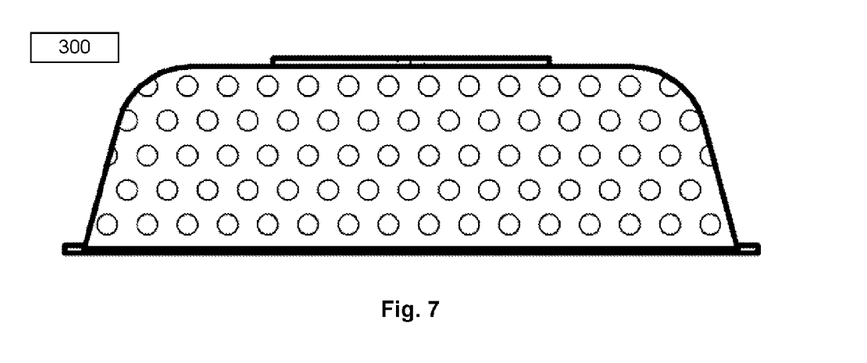
FIG. 7 is a side view of one component of the system for preventing boilover.
Figure 8:
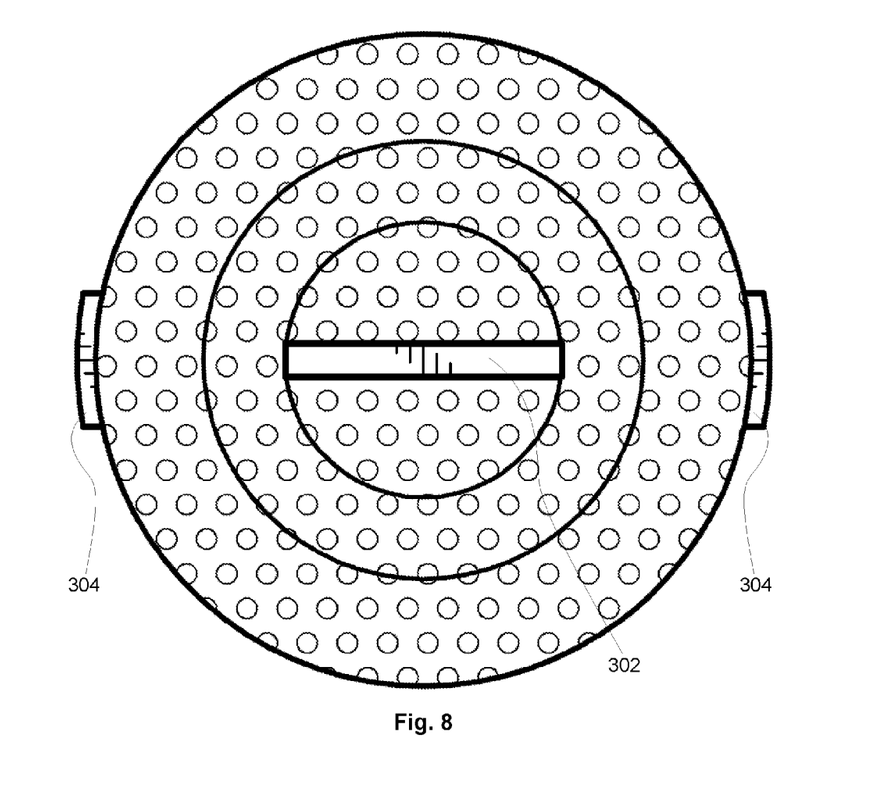
FIG. 8 is a top view thereof.

FIG. 7 is a side view of one embodiment of small strainer 300. FIG. 8 is a top view thereof, showing locking means 304 disposed on opposite sides of strainer 300. This is a preferred embodiment, and it should be understood that strainer 300 may have zero, one, two, or more than two locking means 304, depending on the method by which the small strainer is to be coupled with large strainer 200. FIG. 8 also shows one embodiment of handle 302. This is a preferred embodiment that would allow a user to use hands or tongs to place, turn, and remove strainer 300 without prolonged exposure to hot liquid, foodstuffs, or steam. Other handles may be used, as well, depending on the locking method deployed between strainers 200 and 300.

Using FIG. 2 as the exemplary depiction, one exemplary method of use is to place a cooking medium, such as water or broth, into pot 101, along with any foodstuffs to be cooked. Then large strainer 200 is placed into pot 101, perhaps using at least one handle 201 resting on rim 104 to suspend the strainer over the bottom inside surface of the pot. Small strainer 300 is then inserted into large strainer 200, inverted such that the dome or top of the strainer is nearer to the lid 102 than the bottom of the pot 101. Small strainer 300 may be simply set upon rim 205, or it may be locked into place via one of the methods discussed with FIG. 4. The lid 102 may or may not be placed on top of pot 101, depending on the foodstuffs to be cooked. When heat is applied and the cooking medium begins to boil, strainers 200 and 300 in concert disrupt the formation of bubbles that often leads to boilover.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for preventing boilover comprising:
   at least one pot;
   at least one first strainer disposed within the at least one pot, the at least one first strainer including at least:
   a shape consistent with an inverted dome;
   at least one large hole disposed at a low point of the at least one first strainer; and
   at least one groove disposed around a perimeter formed by the at least one large hole,
   at least one second strainer removably coupleable with the at least one first strainer, the at least one second strainer including at least:
   a shape consistent with a dome;
   at least one grip disposed at a high point of the at least one second strainer; and
   at least one tab disposed on a lower rim of the at least one second strainer,
   wherein the at least one second strainer is disposed such that it covers the at least one large hole disposed at a low point of the at least one first strainer and wherein the at least one tab is configured to be removably insertable into the at least one groove of the at least one first strainer.

2. The system of claim 1, wherein the at least one first strainer and at least one second strainer are removably lockable by inserting the at least one tab into at least one entrance location disposed within the at least one groove and twisting the at least one second strainer such that the at least one tab moves further into the at least one groove.

3. The system of claim 1, wherein the at least one first strainer further comprises:
   at least one means by which liquids and gasses can pass from a first side of the strainer to a second side of the strainer.

4. The system of claim 1, wherein the at least one large hole disposed at a low point in the at least one first strainer substantially follows a general shape of the at least one first strainer.

5. The system of claim 1, wherein the at least one second strainer further comprises:
   at least one means by which liquids and gasses can pass from a first side of the strainer to a second side of the strainer.

6. The system of claim 1, wherein the at least one second strainer further comprises:
   a shape consistent with a dome, wherein a high point of the dome is disposed away from a bottom surface of the at least one pot.

7. The system of claim 1, further comprising:
   at least one lid configured to be removably coupleable with at least one of the at least one pot or the at least one first strainer.

8. The system of claim 1, wherein the at least one first strainer further comprises:
   a plurality of small holes distributed across a surface of the strainer such that liquids and gasses can pass from a first side of the strainer to a second side of the strainer.

9. The system of claim 1, wherein the at least one second strainer further comprises:
   a plurality of small holes distributed across a surface of the strainer such that liquids and gasses can pass from a first side of the strainer to a second side of the strainer.

10. A system for preventing boilover comprising:
    at least one pot;
    at least one first strainer disposed within the at least one pot, the at least one first strainer including at least:
    a shape consistent with an inverted dome;
    at least one large hole disposed at a low point of the at least one first strainer;
    at least one groove disposed around a perimeter formed by the at least one large hole; and
    at least one entrance location disposed within the at least one groove;
    at least one second strainer removably coupleable with the at least one first strainer, the at least one second strainer including at least:
    a shape consistent with a dome;
    at least one grip disposed at a high point of the at least one second strainer; and
    at least one tab disposed on a lower rim of the at least one second strainer,
    wherein the at least one second strainer is disposed such that it covers the at least one large hole disposed at a low point of the at least one first strainer and wherein the at least one tab is configured to be removably insertable into the at least one groove of the at least one first strainer by inserting the at least one tab into the at least one entrance location.

11. The system of claim 10, wherein the at least one first strainer further comprises:
    at least one means by which liquids and gasses can pass from a first side of the strainer to a second side of the strainer.

12. The system of claim 10, wherein the at least one large hole disposed at a low point in the at least one first strainer substantially follows a general shape of the at least one first strainer.

13. The system of claim 10, wherein the at least one second strainer further comprises:
    at least one means by which liquids and gasses can pass from a first side of the strainer to a second side of the strainer.

14. The system of claim 10, wherein the at least one second strainer further comprises:
    at least one general shape consistent with a dome, wherein a high point of the dome is disposed away from a bottom surface of the at least one pot.

15. The system of claim 10, further comprising:
    at least one lid configured to be removably coupleable with at least one of the at least one pot or the at least one first strainer.

16. The system of claim 10, wherein the at least one first strainer further comprises:
   a plurality of small holes distributed across a surface of the strainer such that liquids and gasses can pass from a first side of the strainer to a second side of the strainer.

17. The system of claim 10, wherein the at least one second strainer further comprises:
   a plurality of small holes distributed across a surface of the strainer such that liquids and gasses can pass from a first side of the strainer to a second side of the strainer.

18. The system of claim 10, wherein the at least one first strainer and at least one second strainer are removably lockable by inserting the at least one tab into the at least one entrance location and twisting the at least one second strainer such that the at least one tab moves further into the at least one groove.

* * * * *